Patented June 30, 1931

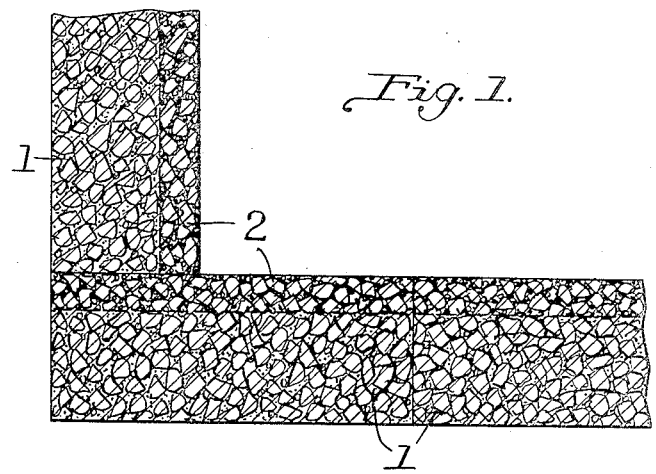
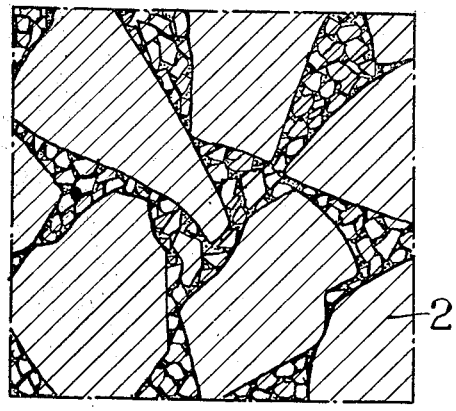
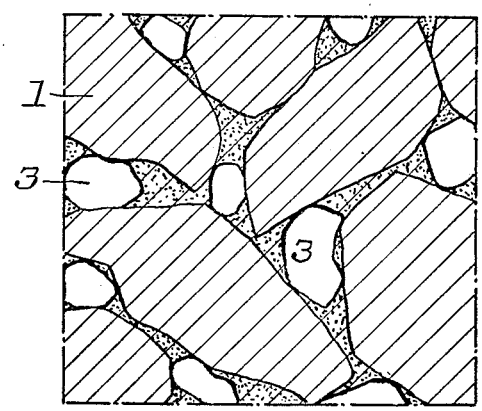

1,812,376

UNITED STATES PATENT OFFICE

DONALD W. ROSS AND JAMES M. LAMBIE, OF WASHINGTON, PENNSYLVANIA

REFRACTORY HEAT INSULATING MATERIAL

Application filed July 26, 1927. Serial No. 208,528.

Our invention relates to refractories, and more particularly to refractory walls that posses heat-insulating properties to a marked degree.

One object of our invention is to provide a refractory that will serve as a heat-insulating material and will not deform under load at high (industrial furnace) temperatures.

Another object is to provide an insulating refractory material that is especially suitable for use in furnace walls, and which will resist abrasion and the fluxing action of molten slags and metals.

Another object is to provide a "light weight" refractory material for use in industrial furnace practice, that nevertherless possesses relatively great load-carrying capacity.

Another object is to provide a refractory material that will more effectively withstand sudden changes of temperature than materials heretofore employed.

Still another object of our invention is to combine the foregoing objects in appreciable degree in one variety of ware.

By the use of our invention, we are able to construct furnace walls and the like of much less thickness than heretofore deemed necessary, and to eliminate the use of less refractory insulating materials, such as kieselguhr, asbestos fiber, and magnesia bonded products, etc., which are commonly employed to insulate furnace walls, in addition to the usual refractory blocks. Not only are we enabled to produce furnace walls of reduced thickness, that will possess proper strength and heat-insulating characteristics, but the saving in weight by the use of our product renders it particularly useful in connection with the furnaces of marine boilers, etc., as in boats of the destroyer type, found in the U. S. Navy.

One feature of our invention resides in the provision of a highly refractory body which is so formed as to have sufficient porosity and dead air spaces to thereby give it the desired heat-insulating property. In order to effect this open work structure, we employ in a refractory body, certain aluminous materials such as cyanite, that expand on being fired, with resulting increases in porosity In many types of refractories, the tendency is for the body to shrink during firing, therefore increasing the density thereof and rendering it unsuitable as a heat insulator.

In those structures wherein the refractory body is exposed to contact with molten slag or metal, for instance, we may provide a layer or coating of denser refractory material than that of the more porous body, to prevent disintegration of the main body through entry of molten material into the interstices thereof and consequent dissolution of the clay bond from the grog particles.

Figure 1 of the accompanying drawings is a sectional view of a portion of a furnace composed of refractory bodies 1, that are of openwork or porous structure, and each faced by a refractory material 2 that is of denser structure; Fig. 2 is a view on a greatly enlarged scale, of a portion of the facing 2, and Fig. 3 is a similar view of a portion of one of the bodies 1.

In the manufacture of the body 1, we provide a grog, preferably of aluminous material, in the raw state which will expand on being fired, such grog being in the form of grains of various sizes, but containing a minimum of fines that may be not less than 100 mesh, for example, so that there will be minimum density of piling, or at least considerable interstitial space. With this grog, we mix sufficient clay to bond the grains, as indicated in Fig. 3 by the dots between the grog particles, but not in sufficient quantity to fill the interstices 3 between the grog grains. The mass is then mixed with water, dried, and then fired to the point at which the grog grains are at least partially expanded. The result is an open porous body. Cyanite will expand at about cone 11, and if the mixture is fired to that extent, the ware thus produced can be employed in industrial furnaces, with little or no further change in volume up to this temperature. However, these materials do not shrink and lose their porosity even at cone 30. For this reason, the refractory bodies are not subject to substantial change under temperatures even above those attained in most industrial furnaces.

It will be understood that firing, at approximately cone 11, for instance, will be extended over a period of time sufficient to effect the desired expansion of the aluminous materials. When aluminous materials, such as cyanite and natural sillimanite have been expanded under heat treatment, as indicated, they will not appreciably decrease in porosity even after extended heat treatments at advanced temperatures.

Grogs, such as cyanite and natural sillimanite, are very refractory and do not vitrify even at temperatures as high as cone 30. Also, they are quite resistant to the attacks of slags, etc.

Various plastic clays may be employed for bonding the grog, but we prefer to use the more refractory clays, such as refractory ball clays similar to those found in Kentucky and Tennessee, or we may use those of the kaolin type. These clays may or may not be deflocculated, as desired. If they are deflocculated, there will be less shrinkage of the bond during drying and firing than if they are in a flocculated condition, and the bonding mixture flows more readily, thus making better contact with the grog, and tending to collect at points where the grog particles are in closest proximity to one another, thus bonding the grog grains into a strong mass, but tending to leave interstices that form dead air spaces within the body.

Because a film of plastic clay tends to seal off the surface between the grog grains and close the pores in the grog, although the main portion of the grog grains are graded so as to yield an open structure, a suitable amount of fines serves to mix with the plastic clay, thus decreasing the cracking of the bond and thereby increasing the strength of the fired product. The assortment of grog sizes used depends upon the nature of the interstices desired in the ware.

During drying and firing of the mixture, shrinkage and some cracking occurs within the plastic clay bond, and between the bond and the grog grains, but such cracking is minimized at the points of contact of the grains with one another. The fired body will thus contain interstices represented by spaces between the grains, cracks within the plastic bond, cracks between the bond and the grog, and by porosity within the grog itself through rupture of individual grains by firing, which is an inherent property of the cyanite.

Instead of bonding the clay particles with clay, we may employ other bonding materials, such as glue, inorganic substances, such as sodium silicate, or organic substances such as wood or coal tars, dextrin, gum tragacanth, etc., or we may use substances that will be volatilized or burned and thus driven off during firing; such as volatile inorganic substances, or volatile or combustible organic substances, such as sawdust, etc. In such mixtures, the uniting of the grog particles will be effected through the formation of a small amount of glass from fluxes present and of radiating crystals upon the grog particles, which interlock with one another during firing and therefore hold the mass of grog particles together.

In some cases, we may have at least a portion of the grog of such character that it will not expand further on firing, as, for instance, such substances as fire clay, including flint clay, or pre-expanded aluminous grog, and we may so grade the grog as to effect any desired density of piling, and hence in that way control the porosity of the finished body. For instance, a grog graded as follows would have a minimum density of piling—that is show large interstitial space:

```
Through 8 mesh and caught on 10 mesh_____ 30%
Through 10 mesh and caught on 14 mesh_____ 50%
Through 14 mesh and caught on 20 mesh_____ 5%
Through 20 mesh and caught on 100 mesh_____ 5%
Through 100 mesh_____ 10%
``` whereas a grog graded as follows would show maximum density of piling, or small interstitial space:

```
Through 8 mesh and caught on 10 mesh_____ 2%
Through 10 mesh and caught on 20 mesh_____ 19.7%
Through 20 mesh and caught on 65 mesh_____ 28.9%
Through 65 mesh and caught on 100 mesh_____ 5.4%
Through 100 mesh_____ 44%
```

During firing of a body similar to that shown in Fig. 3 in which the interstices 3 are in effect blebs, the expansion of the large grains serves to develop porosity within the grains, and through the expansion of these grains they press against one another at their points of contact and tend to cause minor ruptures between portions of the grains 3 and the dotted (clay) portion.

In case a uniform, relatively dense, structure is desired made of similar materials to those herein described; the expanding aluminous material is finely divided and uniformly disseminated through the plastic clay, and the ratio of aluminous material to clay may in some cases be somewhat reduced. In this case, the fine particles are so small that their expansion is largely taken up by the elasticity of the surrounding clay mass and on account of being so small the particles develop practically no internal cracks, so that the volume of pores developed in this manner is practically negligible. An example of such a body is described below as facing 2 of Fig. 1. Some suitable mixtures employing expanding aluminous material and a bonding clay may be as follows:—

```
Aluminous material (expanding)_____ 25% to 90%
Plastic clay _____ 75% to 10%
``` the aluminous material being in the form of grains that are not materially smaller than 100 mesh.

| Aluminous material (expanding) | 10% to 90% |
|---|---|
| Grog (non-expanding) | 30% to 80% |
| Plastic clay | 10% to 80% | the aluminous material being in the form of grains not materially smaller than 100 mesh and the plastic clay being either flocculated or deflocculated. However, we are not limited to these percentages.

Not only is it important to employ grog grains not materially smaller than 100 mesh, for the purpose of reducing density of piling, but we have found it possible, as heretofore stated, to secure greater porosity within the grog grains themselves, through expansion and rupture of the grains upon firing. This rupturing or increase in porosity is noticeable to an appreciable degree at about 100 mesh, and is particularly noticeable in 20 mesh grains and coarser.

The insulating bodies may be formed either by the casting process or by building up the body from a plastic mass of the mixture.

In case it is desired to have the inner walls of the furnace impervious to the penetration of gases and slags and resistant to abrasion, we apply a coating or layer 2 to the inner surface of the block 1. Various materials may be used for this purpose, but we prefer a mixture similar to that employed for making the body, but having greater density of piling, i. e. minimum interstitial space, and sufficient plastic clay and fines of the expanding material are employed to approximately fill the interstices between the coarser grog grains, as shown in Fig. 2 of the drawings.

The coarser grog grains may be larger than 100 mesh and the fines of smaller sizes and so proportioned as to form a dense body wherein all of the grains are substantially in contact with one another, and shrinkage minimized during drying and firing operations.

The grog grains and the fines are preferably, at least in part, of aluminous material that will expand on firing, and sufficient plastic clay as above described, is employed to bond the grog grains together. The grog grading and percentage and kind of plastic clay in the coating 2 are so adjusted that the firing shrinkage of the coating causes the coating to "fit" the body 1, and thereby prevents rupturing as between the body and the coating. The clay will be preferably deflocculated, as by the use of sodium hydroxide, oxalic acid, etc., so as to require a smaller percentage of water, and hence reduce the drying shrinkage. The use of graded grog particles reduces the interstitial space between such particles and therefore less bonding clay is required, with the result that drying and firing shrinkage is still further reduced.

The relatively large quantity of aluminous material in the coating mixture increases its refractoriness and, as the body is quite dense, it offers a considerable resistance to disintegration through contact with the slags.

The coating or lining 2 may be applied by smearing it on with a trowel, by dipping the block in the coating material, by spraying, etc., or by forming the coating integrally with the block.

After application of the coating or facing 2 to the body 1, it will be fired, with the result that the bond clay will harden and crystals will radiate from one portion of the structure to the other and the coating will form in effect an integral part of the body 1.

In previous attempts to make insulating bricks that would serve also as refractories, difficulties have been experienced by reason of the fact that at furnace-operating temperatures, the materials from which the bricks were made will vitrify and shrink. This shrinkage results in cracking and renders the material unfit as an inner wall for a furnace, while the vitrification causes the material to lose its porosity and hence its heat-insulating property. Most of the heat-insulating materials used at present melt entirely at furnace temperatures.

In case it is desired to have the ware expand in use, or fill an exact space in the furnace, as in the case of using the material as "plastic fire brick," we may use the proper percentages of our expanding aluminous material, both raw and calcined, or we may use all raw or all fired, or material that is partly expanded; or we may fire shapes to the point where the expanding aluminous material has been only partly expanded.

As material that will be relatively inert at relatively low temperatures (moderate furnace temperatures) and which will react with the surrounding materials, and expand at the temperatures at which the expanded cyanite begins to contract, we may prefer to use such substances as corundum or fused alumina, or substances such as dead burned alumina hydrate, bauxite or diaspore, either in the body proper or in the facing material.

We claim as our invention:—

1. A heat-insulating body which includes a bonding material and grains of cyanite of such gradation of sizes as to result in minimum density of piling.

2. A heat-insulating body containing a bonding material and cyanite in excess of the bonding material, and a facing for the body containing grains of cyanite so graded as to secure a minimum of interstitial space and which will expand on being fired, to substantially the same degree as the said body.

3. The method of forming a heat-insulating body, which comprises mixing refractory materials including cyanite, and firing the said mixture, the cyanite being in quantity greater than the other material.

4. A heat-insulating body containing a bonding material and cyanite, so graded and in such quantity relative to the bonding material that, on being fired, it will expand and cause interstitial spaces in the body.

5. A heat-insulating body containing grains of cyanite of such size that they develop porosity on firing.

6. A heat-insulating body containing grains of cyanite of such size that they develop porosity on firing, and plastic clay.

7. A porous heat-insulating body containing grains of cyanite and wherein the voids have been developed by permanent expansion of the grains through firing.

8. A heat-insulating body containing a bonding material and cyanite, the cyanite being in the form of grains, at least the major portion of which are of one order of sizes.

9. A heat-insulating body containing grains of cyanite and plastic refractory clay in quantity to incompletely fill the interstices between the grains.

10. A heat-insulating body containing grains of cyanite and plastic refractory clay in quantity to incompletely fill the interstices between the grains, the grains being so graded in size as to secure substantially minimum density of piling.

11. A heat-insulating body containing grains of cyanite and a bonding material, the interstices between the grains being incompletely filled, and a facing for the body having similar drying and firing shrinkages.

12. A heat-insulating body containing a bonding material and grains of cyanite in such greater quantity than the said bonding material that, upon being fired, interstitial spaces will be formed in the body.

13. A heat-insulating body containing grains of cyanite, the major portion of which are of substantially one size that will expand on being fired to such an extent as to cause the formation of interstitial spaces in the body, and plastic refractory clay.

14. A heat-insulating body containing burned grains of cyanite, the said grains being of such size that voids have been produced therein through the expansion thereof by firing.

In testimony whereof we, the said DONALD W. ROSS and JAMES M. LAMBIE have hereunto set our hands.

DONALD W. ROSS.
JAMES M. LAMBIE.